United States Patent
Blakely

[11] 3,901,538
[45] Aug. 26, 1975

[54] QUICK-CONNECT COUPLING
[75] Inventor: Stephen W. Blakely, Godfrey, Ill.
[73] Assignee: Olin Corporation, New Haven, Conn.
[22] Filed: Feb. 13, 1974
[21] Appl. No.: 442,220

[52] U.S. Cl. .......... 285/33; 285/308; 285/315; 285/321
[51] Int. Cl.² .......................... F16L 35/00
[58] Field of Search ........ 285/33, 34, 35, 321, 319, 285/320, 308, 322, 307, 314, 315

[56] References Cited
UNITED STATES PATENTS

| | | | |
|---|---|---|---|
| 2,463,179 | 3/1949 | Iftiger | 285/34 |
| 3,602,009 | 8/1971 | Powell | 285/319 |
| 3,606,393 | 9/1971 | Huntsinger et al. | 285/321 |
| 3,635,501 | 1/1972 | Thomsen | 285/34 |
| 3,653,689 | 4/1972 | Sapy et al. | 285/308 |
| 3,686,896 | 8/1972 | Rutter | 285/319 |

FOREIGN PATENTS OR APPLICATIONS

| | | | |
|---|---|---|---|
| 692,526 | 8/1964 | Canada | 285/308 |

Primary Examiner—Dave W. Arola
Attorney, Agent, or Firm—David A. Jackson; Robert H. Bachman

[57] ABSTRACT

The invention relates to a quick-connect coupling for use with a conventional threaded male coupling member in which a female coupling member is provided of such design that the male member may be inserted and locked without moving or rotating the female member. An inwardly sprung, resilient snap ring is situated within a tubular shell member and is provided with internal threads for engaging and holding the male member in position. The shell is contoured to hold the snap ring in locking engagement with the male member in the event that force is applied to the coupling to pull it apart.

18 Claims, 9 Drawing Figures

QUICK-CONNECT COUPLING

BACKGROUND OF THE INVENTION

This invention relates in general to coupling devices, and more particularly to a quick-connect and disconnect coupling for conduits and the like.

Detachable connections for conduits and the like have conventionally comprised a pair of complementary threaded male and female members which were permanently mounted on the respective conduit ends. When connection of such a coupling was desired, the members were brought into contact and one member was rotated while the other member was kept stationary until rotation was impossilbe, so as to provide the threaded connection. Disconnection of the coupling involved a reversal of the above rotation. This type of coupling provided a satisfactory, leak-proof connection between conduits but was time consuming and could, in some cases, prove to be inconvenient.

Serveral coupling designs have been proposed in the prior art to simplify the connection and disconnection of conduits. One such design is disclosed in U.S. Pat. No. 3,635,501, to Thorne-Thomsen. The disclosed device comprises a female coupling which houses a snap ring possessing internally directed threaded lobes which engage and hold an inserted threaded male member. The operation of the device requires, however, the movement of an outer sleeve or cam-ring into contact with the snap ring to lock the male member in place after its insertion. Likewise, then, the reverse motion of the cam-ring is required to release the male member and permit its removal.

Another quick-connect design has been generally employed which provides the one-step connection of male and female coupling members and relies on the achievement of a locking engagement by entry of the two members into a predetermined position, Thus, for example, U.S. Pat. No. 3,352,576, to Thorne-Thomsen, provides a coupling assembly employing unthreaded male and female members wherein a locking means movably mounted in the female member engages an annular groove located on the male member. Upon insertion of the male member, a spring loaded sleeve mounted on the female member permits the expansion of the locking means and enables the male member to be inserted. Upon reaching the position within the female member whereby the locking means and the annular groove are in alignment, the locking means contracts into the annular groove and permits the sleeve to return to a position which holds the locking means in fixed engagement. Removal of the male member is accomplished by pulling back on the sleeve so as to permit the expansion of the locking means and the disengagement of the male member.

A variation of the one-step coupling is disclosed in U.S. Pat. No. 1,509,651, to Iftiger. Patentee's coupling likewise relies on the locking engagement of two unthreaded surfaces in a particular position, as tapered jaws are provided on a female member to engage an annular indentation on a nipple-like male member upon its full insertion. Release is accomplished by pulling back on an outer sleeve mounted on the female member, causing an attached inner sleeve to communicate with the tapered surfaces of the jaws and force them radially outward and away from contact with the annular groove.

As noted above, all of the previously mentioned coupling designs possess certain structural disadvantages. In the instance where the female coupling is adapted for use with a conventional threaded male coupling, the insertion of the male member into locking engagement requires the movement of a portion of the female coupling member, while those designs which afford one-step locking engagement require a connection between specially prepared unthreaded male and female coupling members which can only achieve locking engagement when united in one position.

Accordingly, it is a principal object of the present invention to provide a coupling device which may be quickly connected and disconnected.

It is a further object of the present invention to provide a coupling device of simple construction and low cost which may be utilized with conventional threaded coupling members.

It is a still further object of the present invention to provide a coupling device which achieves locking engagement in one step.

It is a still further object of the present invention to provide a coupling device wherein locking engagement may be achieved in more than one position.

Further objects and advantages of the present invention will appear from the discussion which follows.

SUMMARY OF THE INVENTION

The coupling of this invention comprises a female coupling member which is adapted for use with a conventional male coupling member and which possesses a novel locking means, the means being such that the two members become automatically locked together by a simple snap action merely upon introduction of the male member into the female member. The locking means of this invention comprises an inwardly sprung, resilient snap ring which is situated within a tubular shell member and is provided with internal threads for engaging and holding the inserted male member in position in the female member regardless of the extent of its insertion. The shell member is contoured to hold the snap ring in locking engagement in the event that force is applied to the connection to pull the members apart. A sealing means possessing an expandable lip member extends into the main portion of the shell member to communicate with the male coupling member regardless of its extent of insertion so as to provide a leak-proof fluid seal. Disengagement of the male member from the female coupling member of this invention is achieved by pulling back on an outer sleeve member situated on the female coupling whereby an attached biasing means comprising an angled end portion contacts longitudinally projecting extensions of the snap ring and forces the snap ring to move radially away from the male member.

In an alternate embodiment of the invention, the biasing means of the sleeve is deleted and replaced by wing-like tabular projections which extend from the snap ring to the outside of the shell member such that compression of these projections against the outer surface of the shell member causes the aforenoted radial movement of the snap ring and the release of the male coupling member.

The coupling of this invention can be employed with conventional male couplings and is economical to manufacture. Connection of the male member is an accomplished in one step and is not restricted to one position.

Separation of the two members is equally expeditious by a simple operation performed on the female member while pulling the members apart.

BRIEF DESCRIPTION OF THE DRAWINGS

In the detailed description of the invention which follows, reference will be made to the attached drawings in which.

DETAILED DESCRIPTION OF THE PREFERRED EMBODIMENTS

Figure 1:
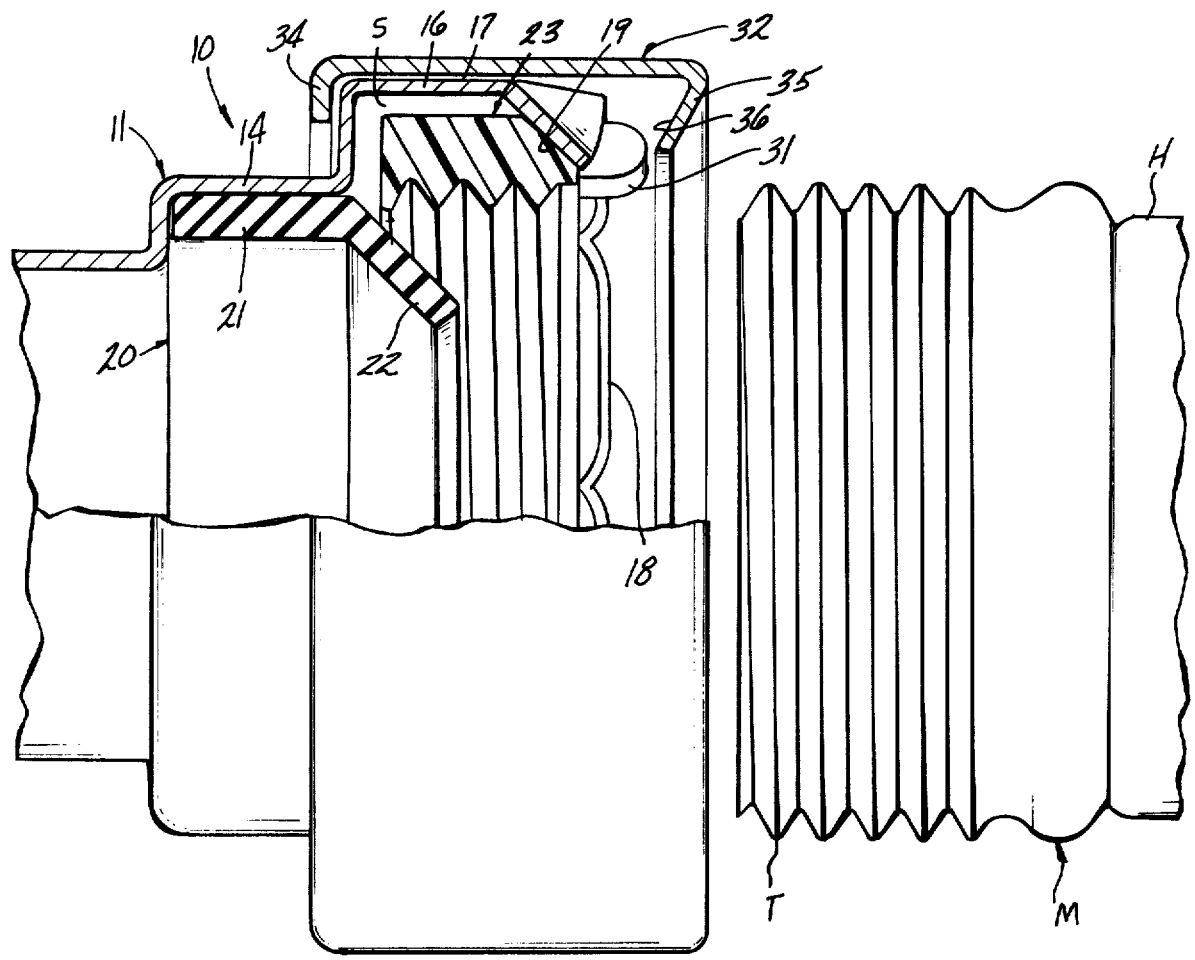
FIG. 1 is a side elevation partly in section of one embodiment of the present invention showing the female coupling member prior to introduction of the male member.
Figure 2:
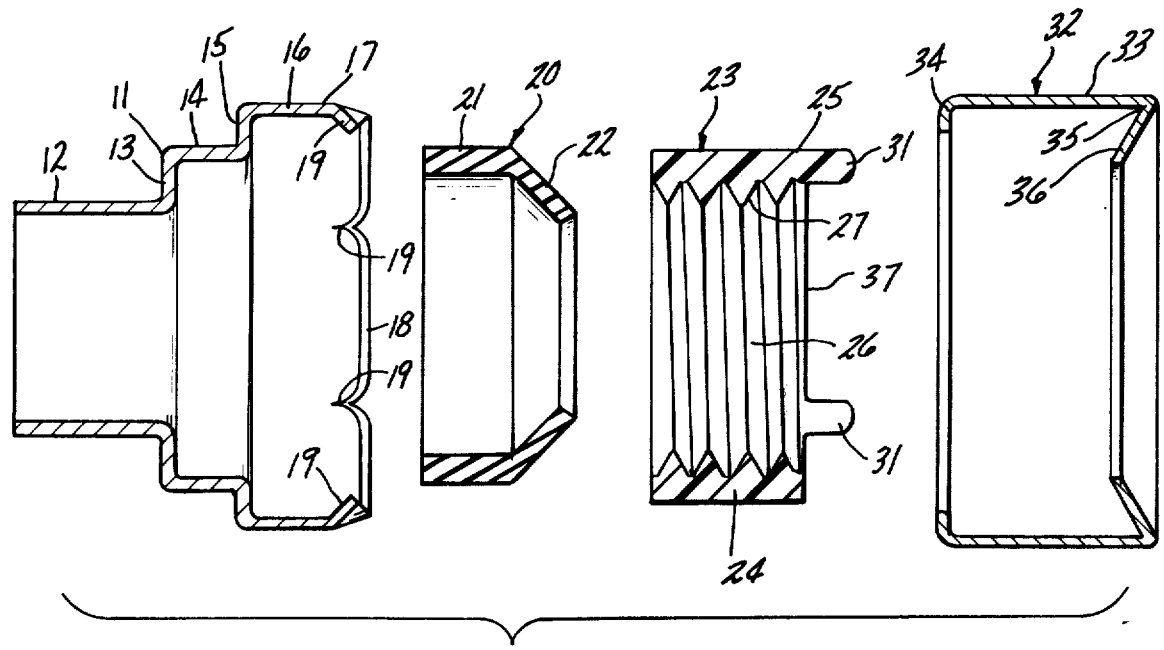
FIG. 2 is an exploded sectional view of the female coupling member of FIG. 1.

According to one embodiment of the present invention depicted in detail in FIGS. 1 and 2, there is shown a quick-connect coupling comprising a female coupling member designated generally as 10 comprising a shell member 11 which, as can be seen from FIG. 2, has a tubular elongated shank portion 12. The shell member diameter then increases at 13 to form a first enlarged portion 14, which houses the sealing means. The diameter of the shell member then increases once again at 15 to form the main portion thereof 16, which houses the inwardly sprung, resilient snap ring. The outer surface 17 of the main portion 16 communicates with an outer sleeve member in a manner hereinafter described. The main portion terminates in a mouth portion 18 which is defined by a series of equally spaced indentations which define inwardly extending cam members 19.

The first enlarged portion 14 of shell member 11 houses the sealing means of this invention. The sealing means 20 comprises a hollow gasket portion 21 which is axially and radially inwardly extended on one end thereof to define a lip member 22. Lip member 22 can be visualized as frustoconical in shape, and, when sealing means 20 is positioned within first enlarged portion 14, will extend into the area defined by the main portion 16 to communicate with the male member M to be inserted, in a manner to be described hereinafter.

The sealing means of this invention must be sufficiently flexible to permit the expansion of lip member 22 during operation, while at the same time possessing sufficient resilience to retain its basic shape throughout long periods of intensive use. Several materials have been found to be suitable in this regard, among them natural and synthetic rubbers and substances such as polyvinyl chloride. Materials such as those aforenoted, which possess Durometer readings of about 50 possess suitable elasticity and resilience for the purpose of this invention. The invention is not limited thereby, however, as other uses of the coupling are possible which might require a sealing means prepared from a material possessing Durometer readings either higher or lower than that set forth above.

Figure 5:
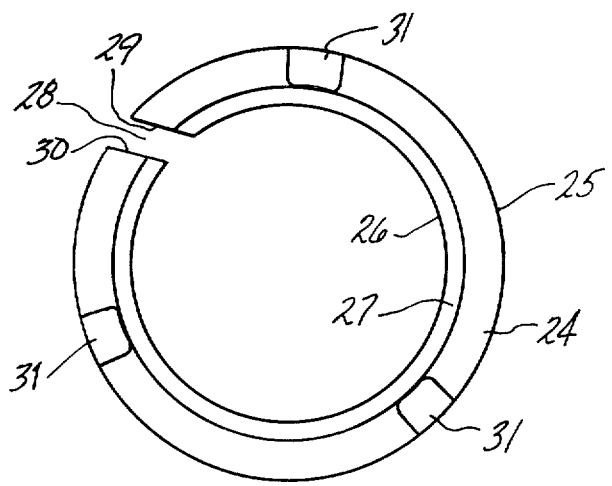
FIG. 5 is a top view of the snap ring shown in FIG. 2.

The main portion 16 of shell member 11 houses the inwardly sprung, resilient snap ring 23 which is shown in greater detail in FIGS. 2 and 5. The body 24 of the snap ring 23 possesses a smooth outer surface 25 and a threaded inner surface 26 for engagement with the threads of an inserted male member. The threads 27 defined by inner surface 26 may vary in depth, and may, for example, range from the standard 60° threaded angle to a shallower 100° angle without impairing the ability of the snap ring to successfully engage a wide variety of threaded male members.

Referring specifically to FIG. 5, the snap ring possesses a longitudinal split along the body 24 which defines the expansion section 28. The expansion section 28 permits the adjustment of the diameter of the snap ring to accommodate variations in the diameter of different male members. The configuration of the expansion section 28 comprises an important feature of the snap ring. The surfaces 29 and 30 which define the expansion section are parallel to each other and are disposed at an angle with respect to the outer surface 25 of the snap ring. The disposition, or taper, of the surfaces facilitates removal of the ring for replacement. Thus, upon compressing the snap ring, surfaces 29 and 30 contact and move easily across each other, thereby further reducing the diameter of snap ring and enabling it to be lifted out of the main portion 16 of the shell member. In like manner, insertion of the snap ring into main portion 16 is also made easier.

Referring to FIGS. 1, 2 and 5, the snap ring possesses a plurality of nodular extensions 31 which project longitudinally from the body 24. The extensions 31 pass through the areas lying between the cam members 19 to communicate with a sleeve member 32 in the manner depicted in FIG. 1, which will be discussed in greater detail hereinafter, so as to expand the diameter of the snap spring 23 thereby allowing the male coupling to escape. For purposes of illustration in FIG. 5, three such extensions are depicted, however, the number and size of such extensions is not critical and is subject to variation within the scope of this invention to perform the expansion of the snap ring.

Referring now to FIGS. 1 and 2, a sleeve member 32 is mounted on shell member 11 in sliding relationship with the outer surface 17 of the main portion of the shell member. The sleeve member 32 comprises a sleeve body 33 and inturned end portions 34 and 35 which serve to affix the sleeve to the shell member. In addition, end portion 35 is at an acute angle with respect to sleeve body 33 and comprises a biasing means 36 which engages the extensions 31 on the snap ring during release of the male member.

In the operation of the quick-connect coupling of FIG. 1, when a standard male hose coupling M, for example, possessing threads T and attached to hose H, is introduced, it forces the snap ring 23 to expand upwardly by means of expansion section 28 into the space S between the outer surface 25 of the snap ring and the main portion 16 of the shell member. The male member will move forward until it encounters the lip member 22 of the sealing means and the threads T engage the threads 27 of the snap ring.

Figure 3:
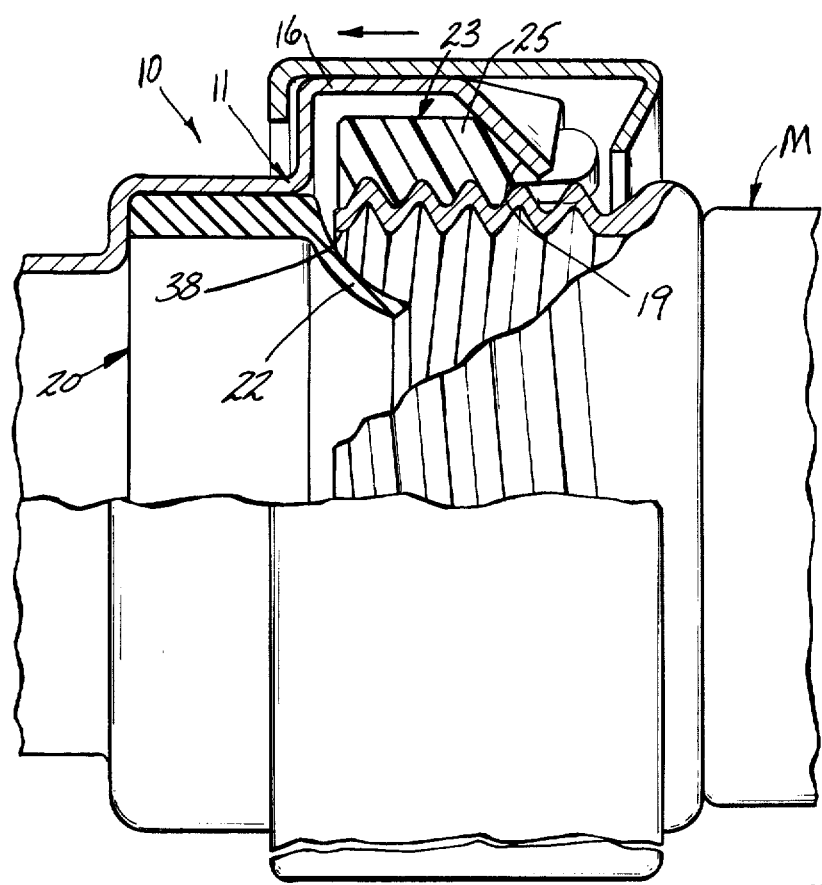
FIG. 3 is a sectional view of the female coupling member of FIG. 1, showing the male member in locking engagement therewith.

As shown in FIG. 3, the male member M is coupled to the female member 10 by threaded engagement with the snap ring 23. Because the snap ring is inwardly sprung, no external force is needed to engage the male member, and the coupling operation thus, requires only the insertion of the male member. If after engagement is completed, force is applied to pull the couple apart, the snap ring 23 will ride forward in engagement with the male member until the leading edge of the body 24 (designated as 37 in FIG. 2) contacts the cam member 19 defined by the indentation of the main portion 16 of shell member 11. As further forward motion is attempted, the cam member 19 will force the snap ring 23 radially inward so as to hold the male member in motionless locking engagement Referring again to FIG. 3, when the male member is coupled with the female member, lip member 22 of sealing means 20 is somewhat distended but extends into the male coupling member. In the event that the coupling device of this invention is employed in a fluid conduit, sealing means 20 will respond to the pressure differential created by the fluid, and lip member 22 will expand radially outward and against the inner surface 38 of the male member so as to form a leak-proof seal. The size of the lip member 22 is such that an effective seal can be establisbed although the male member is only partially inserted. The use just described, however, is merely exemplary, and the instant coupling device may be employed wherever a quick-connect and disconnect assembly is desired between two parts. For example, by suitable modification the instant coupling may be employed for joining electrical transmission members, the male and female members of the electrical connector being securely mounted within a conventional male coupling member and the female coupling member of this invention, respectively.

Figure 4:
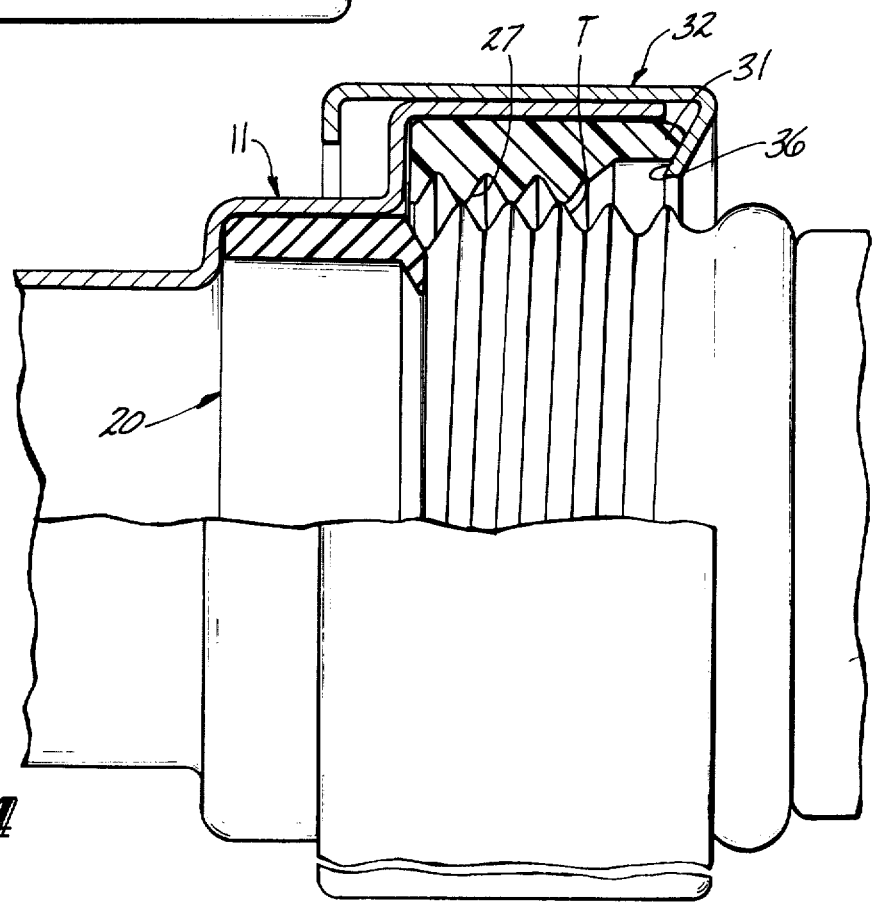
FIG. 4 is a sectional view of the female coupling member of FIG. 1, showing the disengagement of the male member.

When removal of the male member from engagement with the female coupling of this invention is desired, sleeve member 32 is moved longitudinally in the opposite direction from the male member as illustrated in FIG. 4. Biasing means 36 is thereby brought into contact with the extensions 31 of the snap ring, forcing the extensions radially outward and causing the snap ring 23 to expand and release the threads T of the male member. When this is done, the male coupling can be removed by simply pulling it away from the female coupling 10.

The shell member 11 shown in FIGS. 1 – 4 is designed for the case where it may be shrink fitted, crimped or otherwise fastened onto various conduits and appliances, fluid carrying and otherwise. Those skilled in the art can readily determine proper fabrication methods for holding the shell member shank 12 in engagement with the various conduits and appliances as aforenoted.

Figure 6:
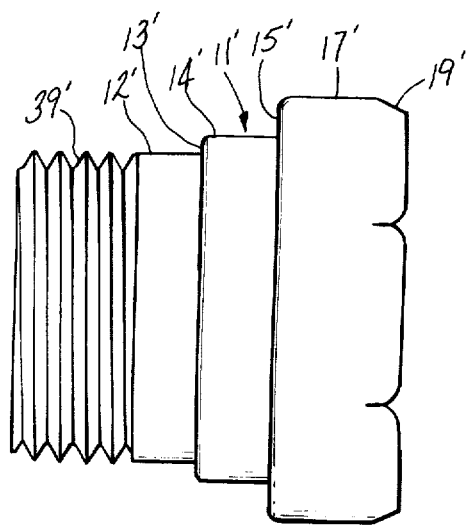
FIG. 6 is a side elevation of the shell member shown in FIG. 2 modified by the projection of a threaded end portion.

In the embodiment shown in FIG. 6, the structure of the shell member 11', in so far as portions 13' - 18' are concerned, is the same as that shown in FIG. 2, however, it is apparent that shank portion 12' differs from shank 12 in that threads 39' are provided. The threads 39' allow the coupling device to be secured into the standard threaded female coupling which is found on such conduits and appliances as, for example, garden hoses, sprinklers, carwash-brush assemblies, insecticide dispensers and related articles. Thus, after the coupling device of this invention is secured into these appliances they may then be connected to a male hose coupling without the need of extended turning of threaded members. Additionally, if the coupling device having the threaded shank of FIG. 6 is secured into the standard female hose coupling, the hose can very easily be connected to conventional outdoor water taps which are generally standard male hose couplings. It is readily apparent that many uses exist in conjunction with fluid-carrying conduits and appliances for the coupling device of this invention.

Figure 7:
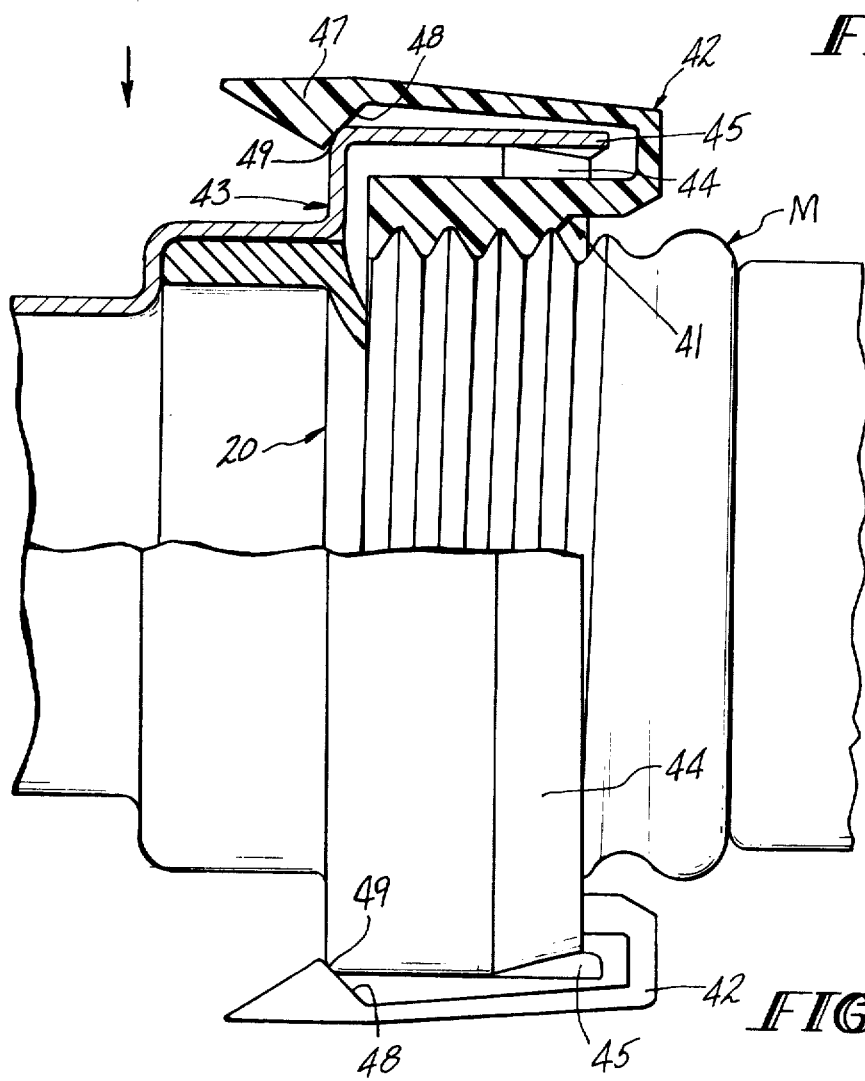
FIG. 7 is a side elevation partly in section of another embodiment of the invention illustrating a male member in locking engagement therewith.
Figure 8:
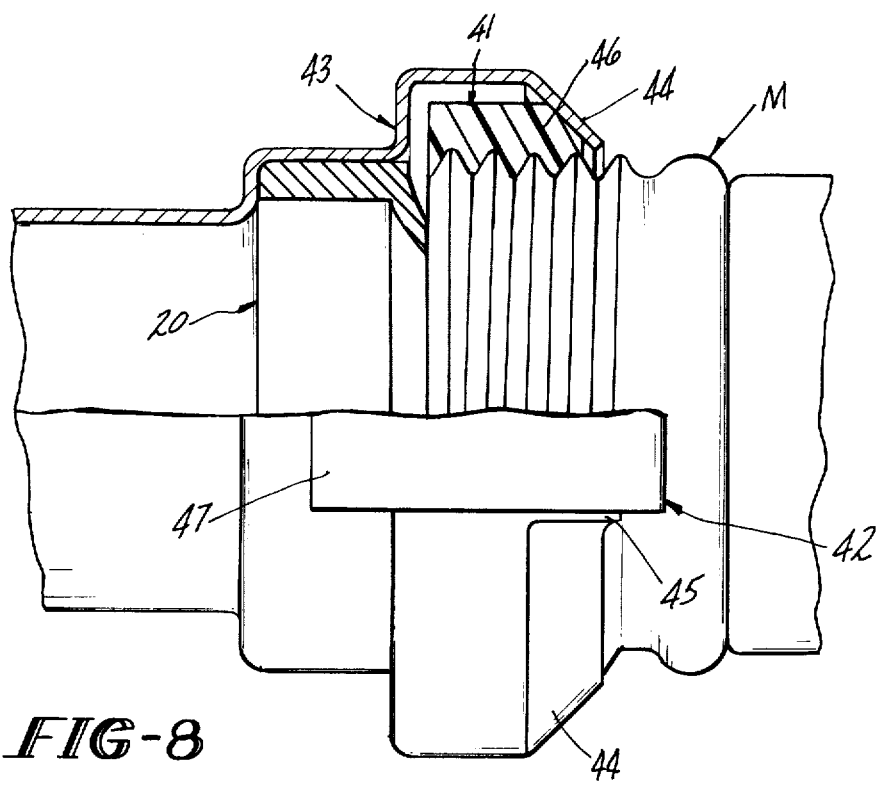
FIG. 8 corresponds to the view of the coupling shown in FIG. 7 rotated 90° about its longitudinal axis.
Figure 9:
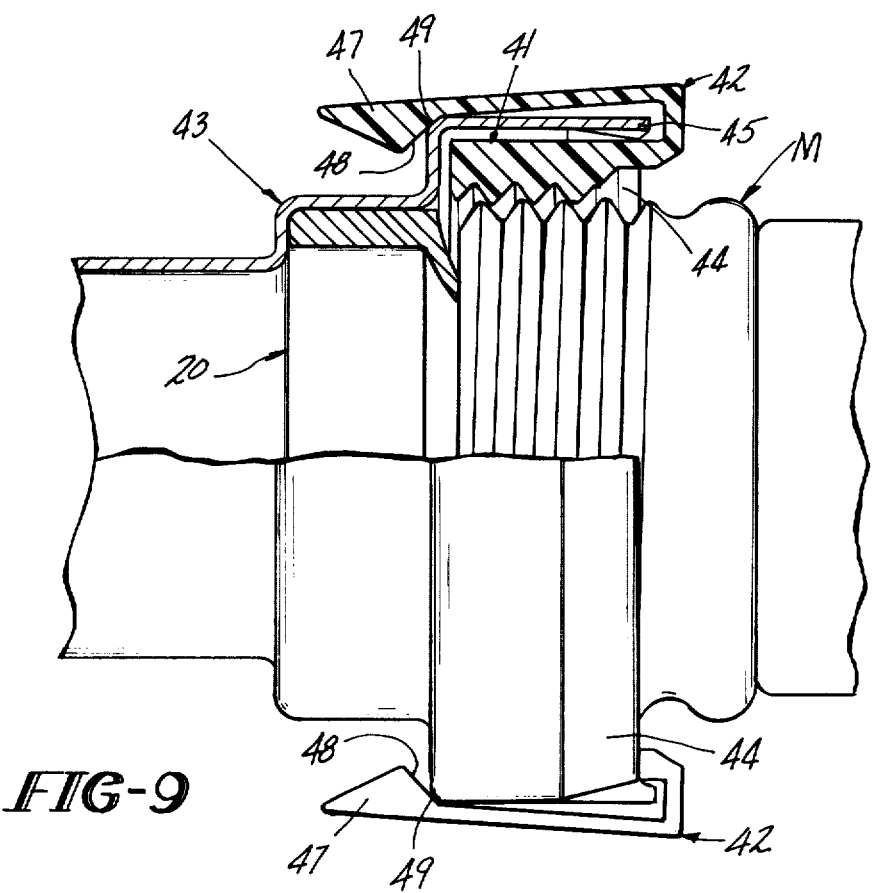
FIG. 9 is a side elevation partly in section illustrating the disengagement of the male member from the female coupling member of FIGS. 7 and 8.

In another embodiment of the present invention shown in FIGS. 7 – 9, the sleeve member has been deleted and the snap ring has been modified to provide the biasing means.

Referring specifically to FIG. 7, snap ring 41 possesses two laterally opposed tab members 42 which project outwardly from the snap ring and extend longitudinally along the outside of shell member 43. The extensions 31 which project from snap ring 23 as illustrated in FIG. 1, have been deleted, along with the sleeve member 32, as noted above.

Shell member 43 differs from the shell member 11 of FIG. 1 by the replacement of the inwardly extended cam members 19 with a continuous inwardly funneled surface 44 which is interrupted at two diametrically opposed points to define longitudinally extended passageways 45 which provide for the unrestricted extension of tab members 42. The configuration of the funneled surfaces 44 is clearly illustrated in FIG. 8. The locking mechanism of this embodiment is similar to that of FIG. 1, with minor modification. Snap ring 41 possesses a beveled surface 46 which engages the funneled surface 44 of shell member 43 when an attempt is made to force the male coupling member M out of engagement.

Insertion and locking engagement of the male member with the female member of this embodiment is the same as that described for the embodiment of FIGS. 1 – 6. When removal is desired, however, a slightly different procedure must be followed. Instead of grasping the sleeve member 31 depicted in FIG. 1, and longitudinally pulling away from the male member, the tab members 42, situated as in FIG. 7, are grasped at distal end portions 47 and depressed as shown in FIG. 9. The end portions 47 possess tapered surfaces 48 which are in slidable relation with the circumferential outer corner surface 49 of shell member 43 and serve as a biasing means for expanding the diameter of snap ring 41 to release the male member. Thus, when removal is desired and end portions 47 are depressed, tapered surfaces 48 slide across the corner surface 49 so as to expand snap ring 41 as shown in FIG. 9, and release the male member M from threaded engagement.

The remaining structures and modifications disclosed in the description of the coupling of FIGS. 1 – 6 are equally applicable to this embodiment. Thus, the sealing means 20 is of identical construction and the shell member 43 may be fitted with a threaded shank as previously shown for shell member 11 in FIG. 6.

The coupling of this invention may be produced from any desired material, and any desired manner. However, it has been found that sheet brass is particularly advantageous in the production of this device. Such material results in a durable coupling which is capable of being produced at a low cost. All parts of the instant coupling may be of sheet brass other than the sealing means as aforenoted, and the snap ring. The snap ring may be manufactured from synthetic resins which may be determined within the skill of the art to possess the requisite resiliency and hardness.

It is to be understood that the invention is not limited to the illustrations described and shown herein which are deemed to be merely illustrative of the best modes of carrying out the invention, and which are susceptible of modifications of form, size, arrangement of parts and details of operation, but rather is intended to emcompass all such modifications which are within the spirit and scope of the invention as set forth in the appended claims.

What is claimed is:

1. A quick-connect coupling device comprising a female coupling member adapted for use with a conventional threaded male coupling member, said female member comprising:
    A. a tubular shell member for receiving said male member comprising a shank portion, a first enlarged portion, a larger main portion, and a mouth portion;
    B. a sealing means housed within said first enlarged portion;
    C. an inwardly sprung snap ring located within said main portion adjacent said sealing means possessing internal threads adapted for engaging and holding said male member;
    D. a locking means located in said main portion which contacts and forces said snap ring radially inward into locking engagement with said male member when removal without release is attempted; and
    E. biasing means annularly displaced from said locking means for releasing said male member from engagement by forcing said snap ring to expand radially out of contact therewith.

2. The device of claim 1 wherein said shell member possesses a threaded shank portion.

3. The device of claim 1 wherein said snap ring possesses a longitudinal split to define an expansion section.

4. The device of claim 3 wherein said expansion section is defined by parallel tapered surfaces.

5. The device of claim 1 wherein said sealing means comprises a hollow gasket portion and a frustoconical lip member extending therefrom.

6. The device in claim 1 wherein,
    said snap ring possesses a plurality of nodular extensions which longitudinally project toward said biasing means,
    said locking means comprises a plurality of inwardly extending cam members defined by equally spaced indentations of said mouth portion lying between said nodular extensions, and
    said biasing means comprises a sleeve member in sliding relationship with the outer surface of said main portion which possesses an inwardly directed end portion which extends into said main portion whereby, when said sleeve member is slidably moved away from said male member, said end portion engages said nodular extensions so as to radially expand said snap ring.

7. The device of claim 6 wherein said shell member possesses a threaded shank portion.

8. The device of claim 6 wherein said snap ring possesses a longitudinal split to define an expansion section.

9. The device of claim 8 wherein said expansion section is defined by parallel tapered surfaces.

10. The device of claim 6 wherein said sealing means comprises a hollow gasket portion and a frustoconical lip member extending therefrom.

11. The device of claim 1 wherein,
    said snap ring possesses two outwardly projecting, laterally opposed tab members which extend longitudinally along the outside of said shell member,
    said locking means comprises a continuous inwardly funneled surface which is interrupted at two diametrically opposed points to provide passage ways for said tab members, and
    said biasing means comprises two tapered surfaces located on the distal end portions of said tab members in slidable relation to the outer surface of said main portion whereby, when said distal end portions are depressed against said shell member, said surfaces slide across outer surface and cause said tab members to pull said snap ring radially outward.

12. The device of claim 11 wherein said shell member possesses a threaded shank portion.

13. The device of claim 11 wherein said snap ring possesses a longitudinal split to define an expansion section.

14. The device of claim 13 wherein said expansion section is defined by parallel tapered surfaces.

15. The device of claim 11 wherein said sealing means comprises a hollow gasket portion and a frustoconical lip member extending therefrom.

16. The device of claim 5 wherein said lip member extends within the inner surface of said male member and expands thereagainst in response to internal fluid pressure to provide a leak-proof seal.

17. The device of claim 10 wherein said lip member extends within the inner surface of said male member and expands thereagainst in response to internal fluid pressure to provide a leak-proof seal.

18. The device of claim 15 wherein said lip member extends within the inner surface of said male member and expands thereagainst in response to internal fluid pressure to provide a leak-proof seal.

* * * * *